US008508668B2

(12) United States Patent
Luo et al.

(10) Patent No.: US 8,508,668 B2
(45) Date of Patent: Aug. 13, 2013

(54) METHOD AND SYSTEM FOR UTILIZING NON-LOCAL MEANS (NLM) FOR SEPARATION OF LUMA (Y) AND CHROMA (CBCR) COMPONENTS

(75) Inventors: Wei Luo, Shanghai (CN); Dong-Jian Wang, Shanghai (CN); Xavier Lacarelle, Bagnolet (FR)

(73) Assignee: Broadcom Corporation, Irvine, CA (US)

( * ) Notice: Subject to any disclaimer, the term of this patent is extended or adjusted under 35 U.S.C. 154(b) by 829 days.

(21) Appl. No.: 12/570,114

(22) Filed: Sep. 30, 2009

(65) Prior Publication Data

US 2011/0063517 A1 Mar. 17, 2011

Related U.S. Application Data

(60) Provisional application No. 61/242,632, filed on Sep. 15, 2009.

(51) Int. Cl.
*H04N 9/78* (2006.01)
*H04N 9/77* (2006.01)
(52) U.S. Cl.
USPC ........... 348/663; 348/450; 348/453; 348/669; 348/664

(58) Field of Classification Search
USPC ................. 348/663, 664, 669, 453, 702, 450; 382/162, 224; 345/603, 604
See application file for complete search history.

(56) References Cited

U.S. PATENT DOCUMENTS 6,516,088 B1 * 2/2003 Kondo et al. ................. 382/162

* cited by examiner

*Primary Examiner* — Jefferey Harold
*Assistant Examiner* — Jean W Desir
(74) *Attorney, Agent, or Firm* — Thomas|Horstemeyer, LLP.

(57) ABSTRACT

One or more processors and/or circuits receive a composite video signal and determine a current pixel and a plurality of reference pixels. A plurality of weighting factors corresponding to the reference pixels are determined utilizing non-local means. Chroma components and/or luma components for the current pixel are determined based on weighted least squares utilizing the reference pixels, the weighting factors and information known about the composite signal, for example, sub carrier information. The composite video signal may comprise baseband Y and modulated Cb and/or Cr components. Weighting factors are determined by comparing a block of pixels about the current pixel with a block of pixels about the corresponding reference pixels in a current, previous or future frame. A set of equations comprising reference pixel data, a set of weighting factors and/or the known information may be solved to the determine signal components.

20 Claims, 8 Drawing Sheets

Temporal Aspect of Non-Local Mean Method for Determining Weighting Factors

METHOD AND SYSTEM FOR UTILIZING NON-LOCAL MEANS (NLM) FOR SEPARATION OF LUMA (Y) AND CHROMA (CBCR) COMPONENTS

CROSS-REFERENCE TO RELATED APPLICATIONS/INCORPORATION BY REFERENCE

This application makes reference to, claims priority to, and claims the benefit of U.S. Provisional Application Ser. No. 61/242,632, filed on Sep. 15, 2009 which is incorporated herein by reference in its entirety

FIELD OF THE INVENTION

Certain embodiments of the invention relate to communication systems. More specifically, certain embodiments of the invention relate to utilizing non-local means (NLM) for separation of luma (Y) and chroma (CbCr) components.

BACKGROUND OF THE INVENTION

Video signals may be communicated via broadcast, cable, satellite, Internet, and/or video discs, for example. In most cases, the video signals are formatted in accordance with a standard format, for example, NTSC, PAL and/or SECAM. In this regard, the video signals may comprise a composite of a plurality of video signal components. The video signal components may comprise information from three sources, for example, the composite video signal may comprise luma (Y), blue difference chroma (Cb) and red difference chroma (Cr) information. In some cases, the two streams of chroma information may be modulated by orthogonal phases of a color sub-carrier signal. Furthermore, a baseband luma component and the modulated chroma signals may be combined to form a composite signal which may be modulated by an RF carrier, for example. Video communication systems such as set top boxes and/or TVs may decode the composite signals prior to rendering the video content.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for utilizing non-local means (NLM) for separation of luma (Y) and chroma (CbCr) components, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for utilizing non-local means (NLM) for separation of luma (Y) and chroma (CbCr) components. In various embodiments of the invention, one or more processors and/or circuits may be operable to receive a composite video signal and to determine a current pixel and a plurality of reference pixels in one or more fields or frames of the composite video signal. In addition, a plurality of weighting factors that correspond to the plurality of reference pixels may be determined utilizing non-local means. One or more chroma components and/or luma components for the current pixel may be determined based on weighted least squares utilizing the plurality of reference pixels, the corresponding plurality of weighting factors and information known about the composite video signal. In this regard, the received composite video signal may comprise a baseband Y component, a modulated Cb component and/or a modulated Cr component. The determined one or more chroma components and/or luma components may comprise Y, Cb and/or Cr components. The information known about the composite video signal may comprise subcarrier signal information. Furthermore one of the plurality of weighting factors for a corresponding one of the plurality of reference pixels may be determined by comparing a block of pixels about the current pixel with a block of pixels about the corresponding one of the plurality of reference pixels. The reference pixels may belong to a field or frame that comprises the current pixel or may belong to a field or frame that does not comprise the current pixel. One or more chroma components and/or luma components may be determined for the current pixel based on solving a set of equations. The set of equations may comprise data from a set of the reference pixels, a set of weighting factors corresponding to the set of reference pixels and a set of data comprising the information known about the composite video signal. One or more chroma components and/or luma components may be determined for a plurality of pixels from the one or more fields or frames of pixels. In this manner, Y, Cb and/or Cr components may be separated and/or determined from a composite video signal.

Figure 1:
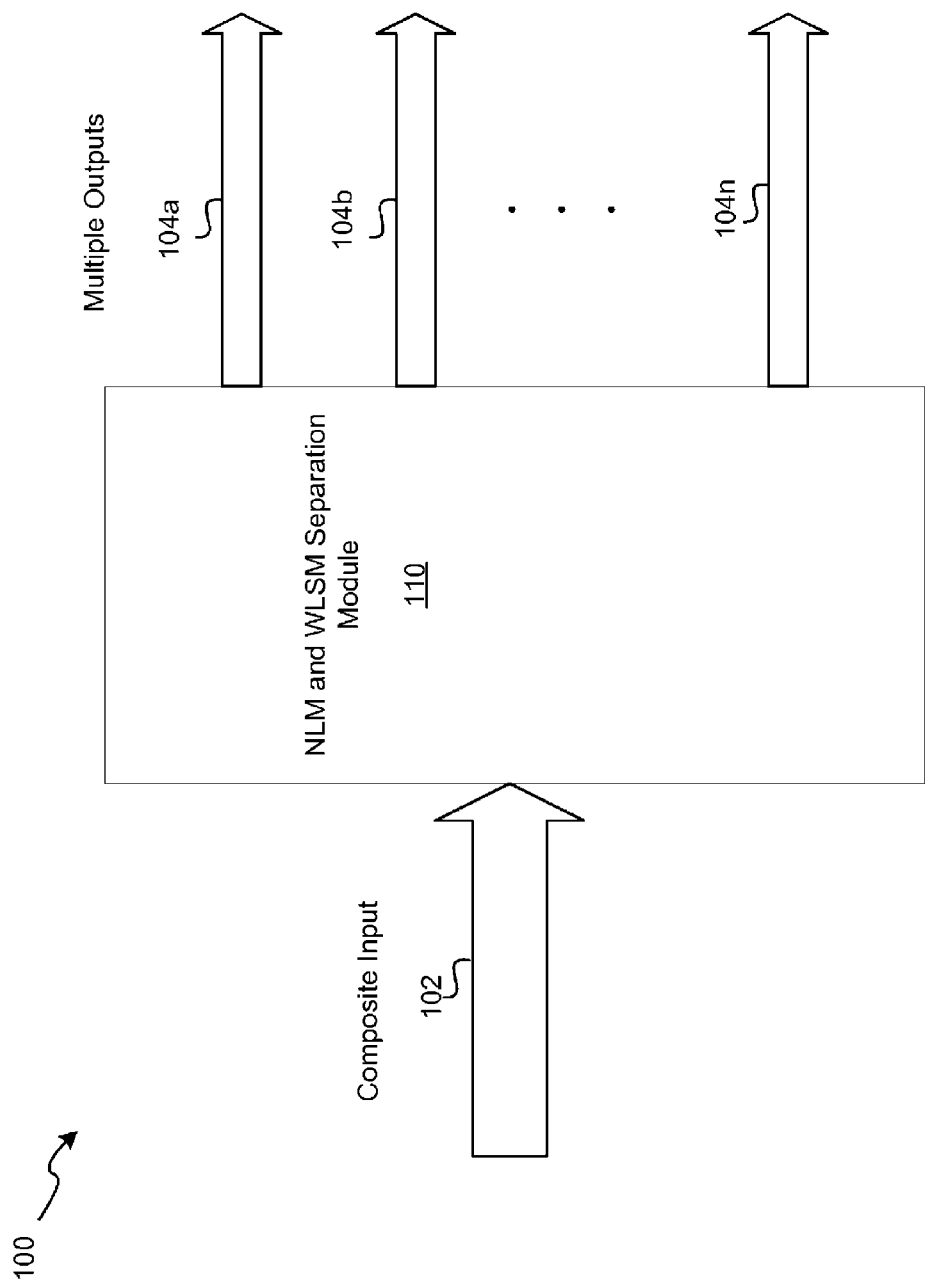
FIG. 1 is a block diagram illustrating separation of a plurality of components of a composite source based on non-local means and weighted least square method, in accordance with an embodiment of the invention.

FIG. 1 is a block diagram illustrating separation of a plurality of components of a composite source based on non-local means and weighted least square method, in accordance with an embodiment of the invention. Referring to FIG. 1, there is shown a processing system 100 comprising a non-local means (NLM) and weighted least squares method (WLSM) separation module 110, a composite input 102 and a plurality of outputs 104a, 104b, . . . , 104n.

The NLM and WLSM separation module 110 may comprise suitable logic, circuitry, interfaces and/or code that may be operable to receive an input comprising a composite signal and/or a composite of different types of information and generate a plurality of outputs that may comprise constituent signals and/or constituent different types of information. In an exemplary embodiment of the invention, the composite input 102 may comprise a composite video signal, for example, a color, video, blank, sync (CVBS) signal. In this regard, the input 102 may be a video signal that may be formatted in accordance with, for example, NTSC, PAL and/or SECAM standards.

In operation, the NLM and WLSM separation module 110 may be operable to receive the composite input 102. The NLM and WLSM separation module 110 may utilize non-local means (NLM) and weighted least square method (WLSM) to separate constituent signals and/or constituent types of information from the composite input 102. In this regard, the NLM and WLSM separation module 110 may utilize NLM to determine a plurality of weighting factors, w, which may correspond to a plurality of samples of the composite input 102 and/or a plurality of samples of constituent signals and/or constituent types of information of the composite input 102. Furthermore, the NLM and WLSM separation module 110 may be operable to determine constituent signals and/or constituent types of information for a specified composite sample of the input 102 based on the plurality of the determined weighting factors w and/or the plurality of corresponding samples of the composite input 102. In this regard, the NLM and WLSM separation module 110 may utilize WLSM to determine the constituent signals and/or constituent types of information from the specified composite sample of the input 102. The NLM and WLSM separation module 110 may output the plurality of constituent signals and/or constituent types of information via the outputs 104a, 104b, . . . , 104n.

Figure 2:
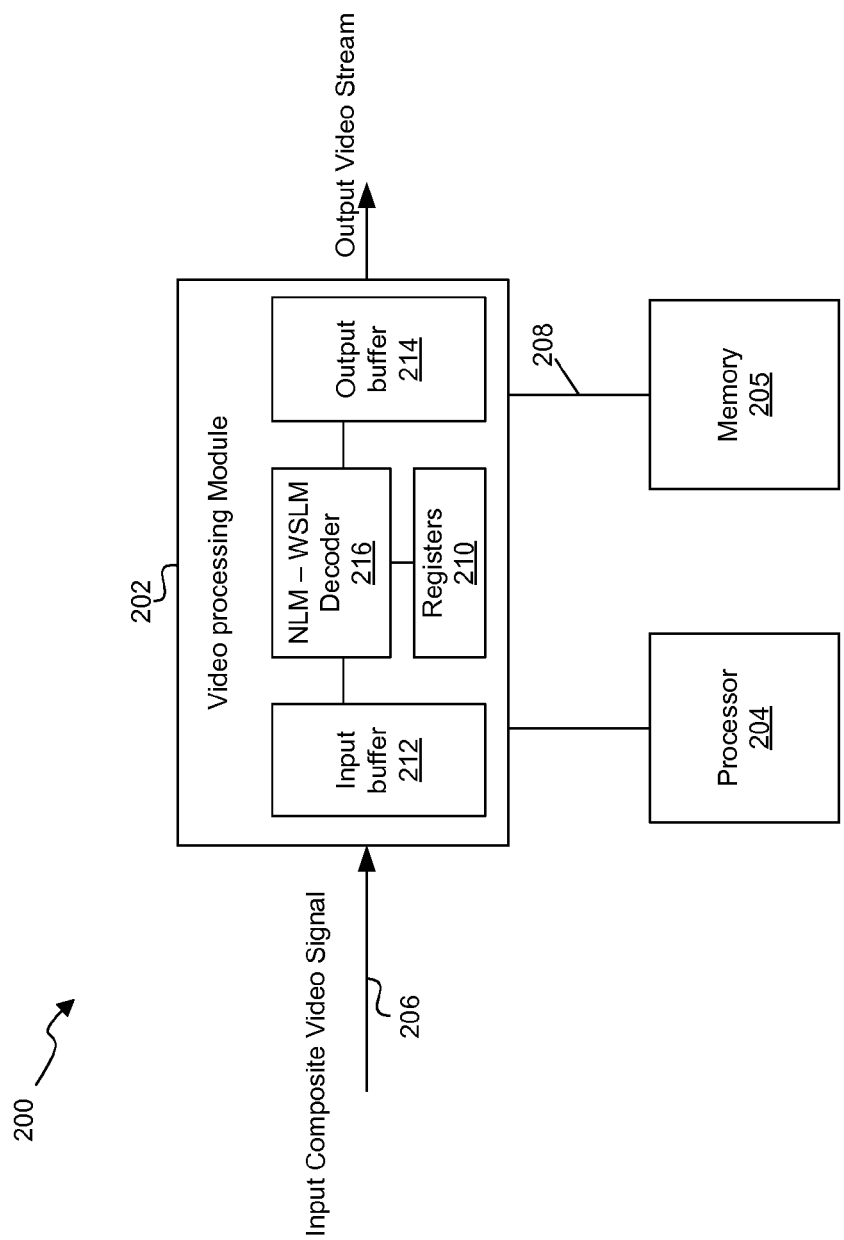
FIG. 2 is a block diagram that illustrates an exemplary video processing system that is operable to separate YCbCr components from a composite signal utilizing non-local means and weighted least square method, in accordance with an embodiment of the invention.

FIG. 2 is a block diagram that illustrates an exemplary video processing system that is operable to separate YCbCr components from a composite signal utilizing non-local means and weighted least square method, in accordance with an embodiment of the invention. Referring to FIG. 2, there is shown a video processing system 200 that comprises a video processing module 202, a processor 204, a memory 205, and a data and/or control bus 208. The video processing module 202 may comprise a non-local means (NLM) and weighted least square method (WLSM) decoder 216 and registers 210. In some instances, the video processing module 202 may also comprise an input buffer 212 and/or an output buffer 214. There is also shown a composite input video signal 206.

The video processing module 202 may comprise suitable logic, circuitry, interfaces, and/or code that may be operable to separate constituent signals and/or constituent types of information from a composite input video signal 206. For example, the video processing module 202 may be operable to separate luma (Y), blue difference chroma (Cb) and/or red difference chroma (Cr) components from the composite input video signal 206. In this regard, the video processing module 202 may generate Y, Cb and/or Cr components of pixels corresponding to the composite input video signal 206. The video processing module 202 may be operable to handle the processing of video frames or pictures in instances when the composite input video signal 206 comprises progressive video signals or interlaced video signals. Interlaced video may comprise video fields that alternate parity between a top field and a bottom field. A top field and a bottom field in an interlaced system may be de-interlaced or combined in the video processing system 200 to produce a video frame or picture.

The video processing module 202 may be operable to receive the composite input video signal 206 and, in some instances, to buffer at least a portion of the received video composite input video signal 206 in the input buffer 212. In this regard, the input buffer 212 may comprise suitable logic, circuitry, interfaces and/or code that may be operable to store at least a portion of the received composite input video signal 206. Similarly, the video processing module 202 may be operable to generate separate Y, Cb and/or Cr output video signals and, in some instances, to buffer at least a portion of the generated separate Y, Cb and/or Cr output video signals in the output buffer 214. In this regard, the output buffer 214 may comprise suitable logic, circuitry, interfaces and/or code that may be operable to store at least a portion of the separated output video signals comprising Y, Cb and/or Cr components.

The non-local means (NLM) and weighted least square method (WLSM) decoder 216 in the video processing module 202 may be similar and/or substantially the same as the NLM and WLSM separation module 110. The NLM and WLSM decoder 216 may comprise suitable logic, circuitry, interfaces and/or code that may be operable to utilize NLM and WLSM methods, described with respect to FIGS. 4, 5, 6 and 7, to separate Y, Cb and/or Cr components of one or more received pixels. The one or more received pixels may each comprise composite information for which the NLM and WLSM decoder 216 may separate and/or determine constituent information and/or constituent signals. For example, the NLM and WLSM decoder 216 may determine Y, Cb and/or Cr components for a current pixel which also may be referred to as a target pixel. The NLM and WLSM decoder 216 may utilize a plurality of received reference pixels as well as a plurality of weighting factors corresponding to the plurality of reference pixels within the framework of the WSLM to determine the Y, Cb and/or Cr components of the current pixel. Exemplary steps for determining the weights are described with respect to FIGS. 5 and 6. The weights may be proportional to the inverse of a measure of similarity of the current pixel and/or a block of pixels grouped about the current pixel and a plurality of reference pixels and/or blocks of reference pixels about each of the plurality of reference pixels. In this regard, the weighting may identify pixel structures that may be the same or similar to a pixel structure located about the current pixel with a high valued weighting factor. The pixel structures may be located within the same field or frame as the current pixel or may be located in a previous or future field or frame. The NLM and WLSM decoder 216 may determine the Y, Cb and/or Cr values for the current pixel based on the WSLM method utilizing known information about the reference pixels, the corresponding weights of the reference pixels and received composite pixel data of the reference pixels.

The processor 204 may comprise suitable logic, circuitry, and/or code that may be operable to process data and/or perform system control operations. The processor 204 may be operable to control at least a portion of the operations of the video processing module 202. For example, the processor 204 may generate at least one signal to control the separation of constituent signals and/or of constituent information within the video processing module 202. Moreover, the processor 204 may be operable to program, update, and/or modify parameters utilized for processing input video data, for example, parameters utilized for determining weights and/or demodulation information. For example, the processor 204 may generate at least one signal to retrieve stored parameters that may be stored in the memory 205 and may transfer the retrieved information to the registers 210 via the data and/or control bus 208. The memory 205 may comprise suitable logic, circuitry, and/or code that may be operable to store information that may be utilized by the video processing module 202 to separate Y, Cb and/or Cr components of a composite input signal for example. The processor 204 may also be operable to control other types of signal processing, for example, de-interlacing and/or de-noising. The memory 205 may be operable to store the configuration parameters to be utilized by the video processing module 202.

In operation, the processor 204 may determine parameters for processing a particular stream of composite video data that may be processed by the video processing module 202. The processor 204 may program the parameters into the registers 210. The video processing module 202 may receive the composite input video signal 206 that may comprise CVBS data. In some instances, the video input stream may be stored in the input buffer 212 before processing. The NLM and WLSM decoder 216 may separate and/or determine Y, Cb and/or Cr components from the received composite input video signal 206. In this regard, the video processing module 202 may generate appropriate weighting factors needed to perform the separation process. The video processing module 202 may generate separated Y, Cb and/or Cr output information for a current pixel utilizing NLM and/or WSLM methods. In some instances, the generated output Y, Cb and/or Cr output information may be stored in the output buffer 214 before being transferred out of the video processing module 202.

Figure 3:
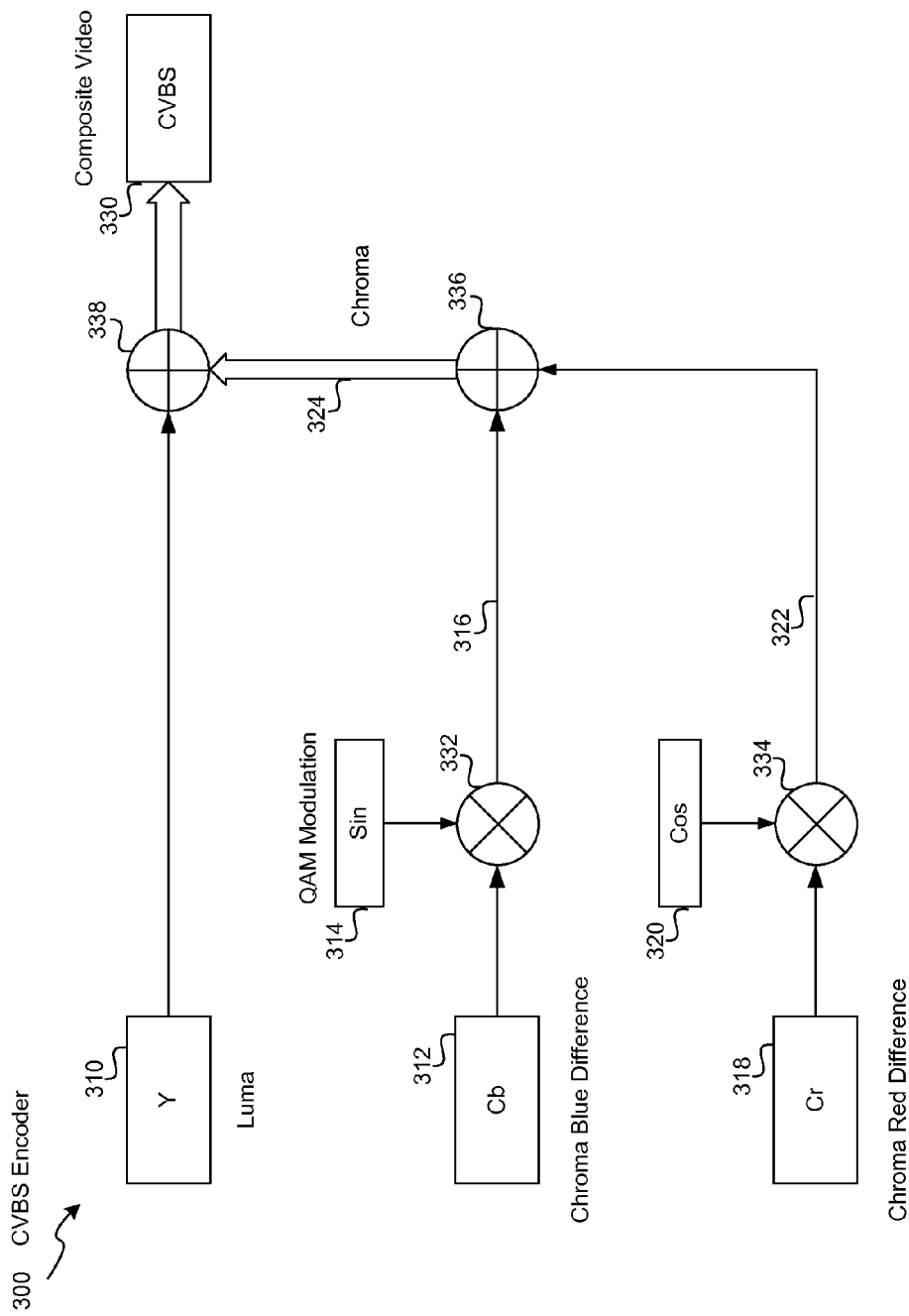
FIG. 3 is a block diagram illustrating an exemplary system that is operable to generate a composite video signal, in accordance with an embodiment of the invention.

FIG. 3 is a block diagram illustrating an exemplary system that is operable to generate a composite video signal, in accordance with an embodiment of the invention. Referring to FIG. 3, there is shown, a CVBS encoder system 300 that may comprise a modulator 332, a modulator 334, summation circuitry 336 and summation circuitry 338. In addition, there is shown a luma pixel signal 310, a Cb pixel signal 312, a Cr pixel signal 318, a subcarrier signal sin ωt 314, a subcarrier signal cos ωt 320, an in phase Cr modulated signal 322, a quadrature phase Cb modulated signal 316, a chroma QAM signal 324, and a CVBS composite video signal 330.

The modulator 332 may comprise suitable logic, circuitry, interfaces and/or code that may be operable to receive the Cb pixel signal 312 and the subcarrier signal sin ωt 314, modulate the subcarrier signal sin ωt 314 with the Cb pixel signal 312 and output the quadrature phase Cb modulated signal 316. Similarly, the modulator 334 may comprise suitable logic, circuitry, interfaces and/or code that may be operable to receive the Cr pixel signal 318 and the subcarrier signal cos ωt 320, modulate the subcarrier signal cos ωt 320 with the Cr pixel signal 318 and output the in phase Cr modulated signal 322. The summation circuitry 336 may comprise suitable logic, circuitry, interfaces and/or code that may be operable to sum the in phase Cr modulated signal 322 and the quadrature phase Cb modulated signal 316. The summation circuitry 336 may output the chroma QAM signal 324. The summation circuitry 338 may comprise suitable logic, circuitry, interfaces and/or code that may be operable to sum the luma pixel signal 310 with the chroma QAM signal 324. The summation circuitry 338 may output a composite video signal that may comprise luma pixel signal 310, in phase Cr modulated signal 322, and quadrature phase Cb modulated signal 316 signal components. In various embodiments of the invention, the summation circuitry 338 may add sync pulses to the composite video signal to generate the CVBS composite video signal 330.

In operation, the CVBS encoder system 300 may be operable to receive the luma pixel signal 310, the Cb pixel signal 312 and the Cr pixel signal 318. The CVBS encoder system 300 may modulate the subcarrier signal sin ωt 314 with the Cb pixel signal 312 and/or may modulate the subcarrier signal cos ωt 320 with the Cr pixel signal 318 and may generate the quadrature phase Cb modulated signal 316 signal components and the in phase Cr modulated signal 322. The quadrature phase Cb modulated signal 316 signal components and the in phase Cr modulated signal 322 may be summed with the luma pixel signal 310 to generate the CVBS composite video signal 330. The CVBS composite video signal 330 may comprise data for a plurality of pixels n that may belong to one or more fields and/or frames of video data and/or a portion of one or more fields and/or frames of video. The plurality of pixels n of the CVBS composite video signal 330 may be represented in accordance with the following N equations:

$$Y_1+Cb_1*\sin \omega t_1+Cr_1*\cos \omega t_1=CVBS_1$$

$$Y_2+Cb_2*\sin \omega t_2+Cr_2*\cos \omega t_2=CVBS_2$$

$$Y_3+Cb_3*\sin \omega t_3+Cr_3*\cos \omega t_3=CVBS_3$$

...

$$Y_N+Cb_N*\sin \omega t_N+Cr_N*\cos \omega t_N=CVBS_N \qquad [1]$$

where N may be equal to a number of pixels that are represented, $Y_n$ may represent luma pixel data from the luma pixel signal 310, $Cb_n$ may represent Cb pixel data from the Cb pixel signal 312, $Cr_n$ may represent Cr pixel data from the Cr pixel signal 318 and $CVBS_n$ may represent pixel data from the CVBS composite video signal 330.

Figure 4:
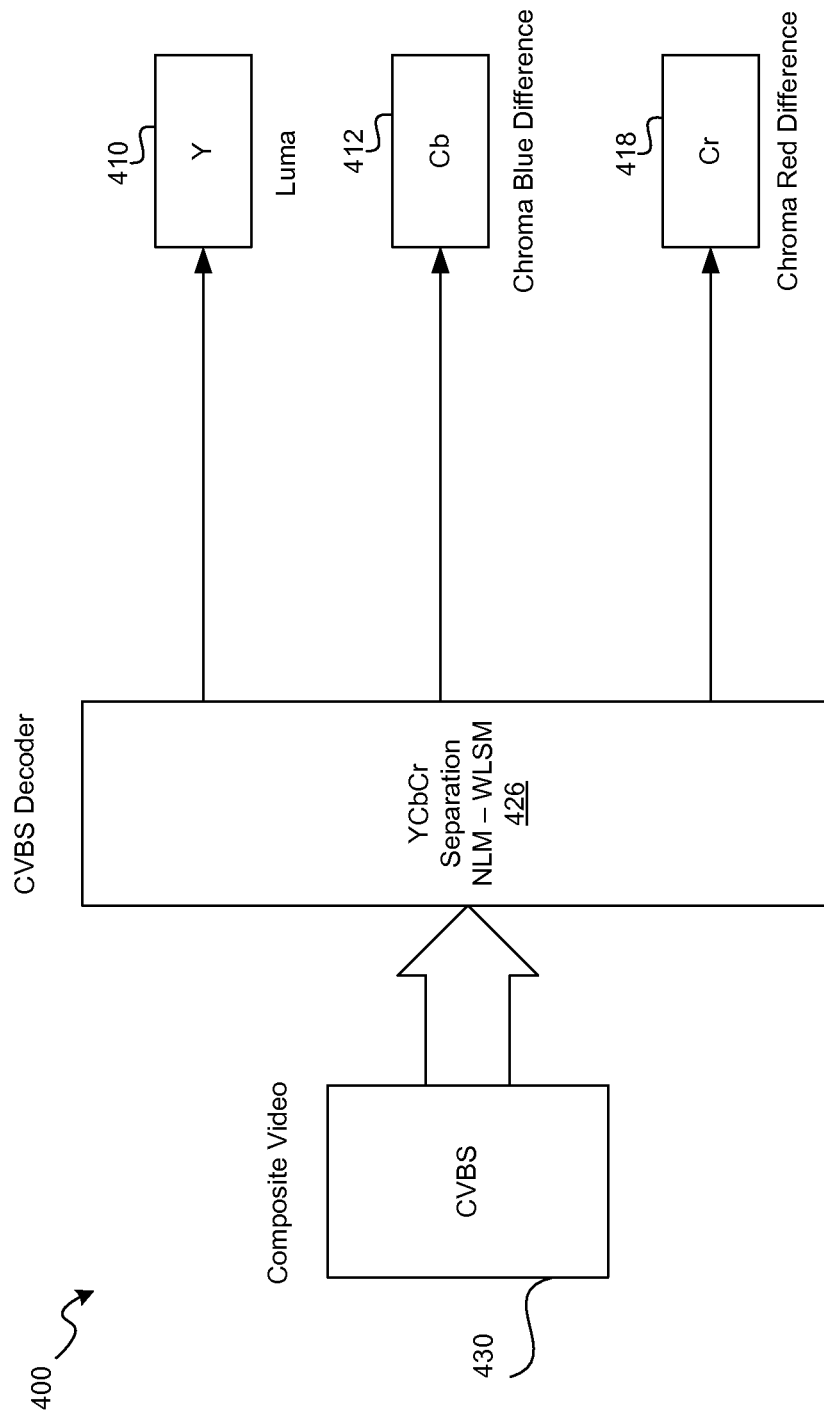
FIG. 4 is a block diagram illustrating an exemplary system that is operable to decode a composite video signal utilizing non-local means and weighted least square method, in accordance with an embodiment of the invention.

FIG. 4 is a block diagram illustrating an exemplary system that is operable to decode a composite video signal utilizing non-local means and weighted least square method, in accordance with an embodiment of the invention. Referring to FIG. 4, there is shown a CVBS decoder system 400, a non-local means (NLM) and weighted least square method (WLSM) decoder 426. Also, there is shown a CVBS composite video signal 430, a luma pixel signal 410, a Cb pixel signal 412 and a Cr pixel signal 418.

The decoder system 400 may be operable to determine from the received CVBS composite video signal 430, Y, Cb and Cr pixel data for each pixel n as represented in the set of equations [1]. For example, the NLM and WLSM decoder 426 may be similar and/or substantially the same as NLM and WLSM decoder 216 and/or the NLM and WLSM separation module 110. The NLM and WLSM decoder 426 may comprise suitable logic, circuitry, interfaces and/or code that may be operable to receive the CVBS composite video signal 430. The CVBS composite video signal 430 may comprise pixel data that may be represented as $CVBS_n$ as shown in the set of equations [1].

The NLM and WLSM decoder 426 may be operable to generate the luma pixel signal 410, the Cb pixel data 412 and the Cr pixel data 418 that may be represented as $Y_n$, $Cb_n$, and $Cr_n$ as shown in the set of equations [1]. Moreover, for each pixel n that may be a member of a current video field or frame, the NLM and WLSM decoder 426 may be operable to determine a plurality of weighting factors w that may be associated with a plurality of other pixels n that may be members of the current video field or frame, members of one or more previous video fields or frames and/or members of one or more future video fields or frames. The values for sin ωt$_n$ and/or cos ωt$_n$ may be known by the decoder system 400, for example. The received composite video signal 430 and the determined weights may be represented as a system of matrices as follows:

$$\left\{\begin{bmatrix} 1 & \sin\omega t_1 & \cos\omega t_1 \\ 1 & \sin\omega t_2 & \cos\omega t_2 \\ \cdots & & \\ 1 & \sin\omega t_n & \cos\omega t_n \end{bmatrix}_{N\times 3} \cdot \begin{bmatrix} Y \\ Cb \\ Cr \end{bmatrix}_{3\times 1}\right\}_W = \left\{\begin{bmatrix} CVBS_1 \\ CVBS_2 \\ \cdots \\ CVBS_n \end{bmatrix}_{N\times 1}\right\}_W \quad [2]$$

where W may be represented as follows:

$$\begin{bmatrix} w_1 & 0 & \cdots & 0 \\ 0 & w_2 & \cdots & 0 \\ \cdots & & & \\ 0 & \cdots & 0 & w_n \end{bmatrix} \quad [3]$$

It may be seen that the system of matrix and vector equations [2] may be represented by the following relationship:

$$Ax_W = b_W \quad [4]$$

where A represents the N×3 matrix comprising known values and/or functions, the vector x represents the desired Y, Cb and Cr values of the current pixel, the vector b represents N received composite pixel values from the CVBS composite video signal 330 and W represents a diagonal matrix comprising the determined weights. As such, the NLM and WLSM decoder 426 may determine a minimum value for x comprising the Y, Cb and Cr values for the current pixel utilizing an L2 norm in accordance with the following expression:

$$\hat{x} = \operatorname{argmin}(\|W^{1/2}(b - Ax)\|_{L2}) \quad [5]$$

For example, the following relationship may be utilized by the NLM and WLSM decoder 426 to generate the Y, Cb and Cr values for the current pixel:

$$x = (A'W^{-1}A)^{-1}A'W^{-1}b \quad [6]$$

In a similar manner, Y, Cb and Cr values may be determined for a plurality of pixels from the CVBS composite video signal 330

Figure 5:
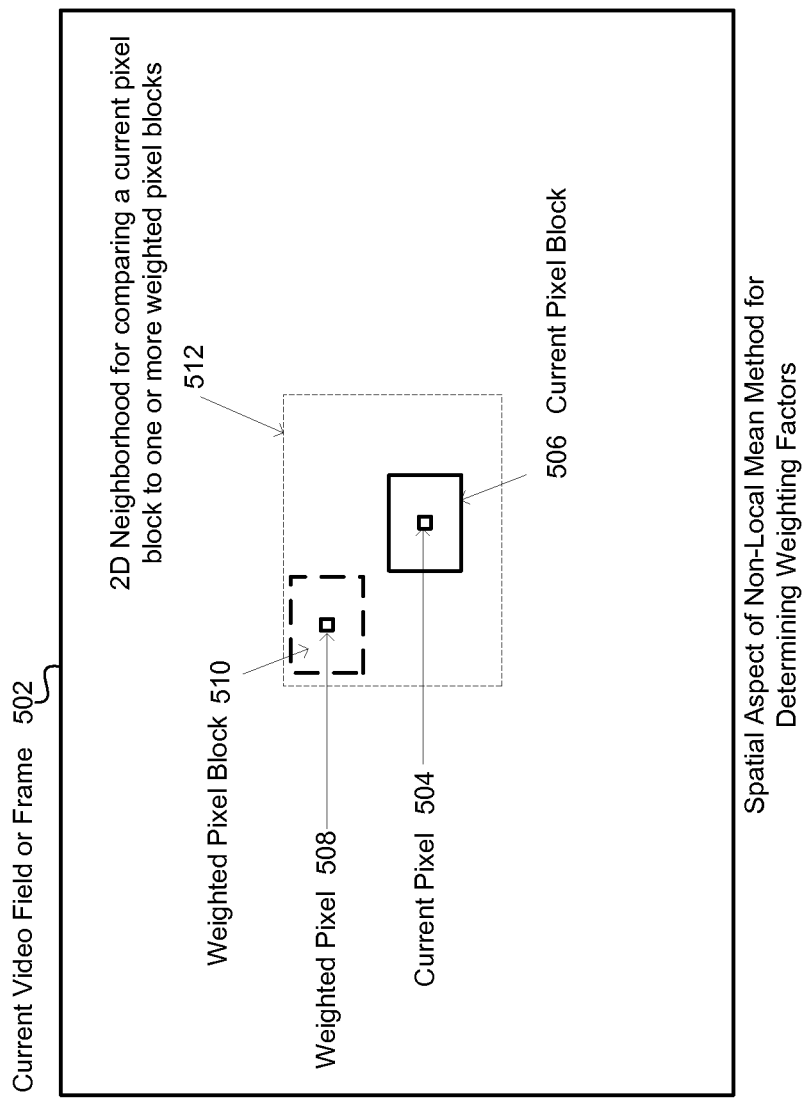
FIG. 5 is a block diagram illustrating non-local means for determining weighting values based on spatial redundancy of pixel structures, in accordance with an embodiment of the invention.

FIG. 5 is a block diagram illustrating non-local means for determining weighting values based on spatial redundancy of pixel structures, in accordance with an embodiment of the invention. Referring to FIG. 5, there is shown a current video field or frame 502, a current pixel 504, a current pixel block 506, a 2-D neighborhood 512, a weighted pixel 508 and a weighted pixel block 510.

The current pixel 504 may be a pixel for which the NLM and WLSM decoder 426 may be determining the Y, Cb and Cr values, for example, the values in the vector x. The current pixel block 506 may comprise a plurality of pixels that may be located near the current pixel 504. For example, the current pixel block 506 may comprise the current pixel 504 and two neighboring pixels. The 2-D neighborhood 512 may comprise a range of a plurality of reference pixels which may be compared with the current pixel block 506. The weighted pixel 508 may be a reference pixel for which a weight factor is determined, for example, a weight factor in the diagonal matrix W. The weighted pixel block 510 may comprise a plurality of reference pixels that may be located near the weighted pixel 508. The weighted pixel block 510 may comprise the same dimensions as the current pixel block. For example, the weighted pixel block 510 may comprise the weighted pixel 508 and two neighboring reference pixels.

In operation, a weighting factor for the current pixel may be determined by comparing information from the current pixel block 506 with information from the weighted pixel block 508. For example, the weighting factor may be determined based on the sum of the absolute differences of the pixels within the current pixel block 506 and the pixels within the weighted pixel block 508. The weights may be assigned a value that is proportional to and/or based on the similarity of the current pixel block 506 and the weighted pixel block 508. In this regard, one weighting factor corresponding to the weighted pixel 508 may be determined and this weighting factor may be utilized in one of the elements of the diagonal matrix W. Accordingly, a row in the A matrix may also correspond with the weighted pixel 506. For example, when weighting factors are determined for N different weighted pixels, there may be N rows in the matrix A. The weighting factors may be determined for a plurality of weighted pixels by shifting the weighted pixel block 508 such that it comprises the newly weighted pixel. The current pixel may then be compared with the new pixel block to determine a weighting factor corresponding with the new weighted pixel. In this regard, the pixel block may be shifted within the 2-D neighborhood 512.

Figure 6:
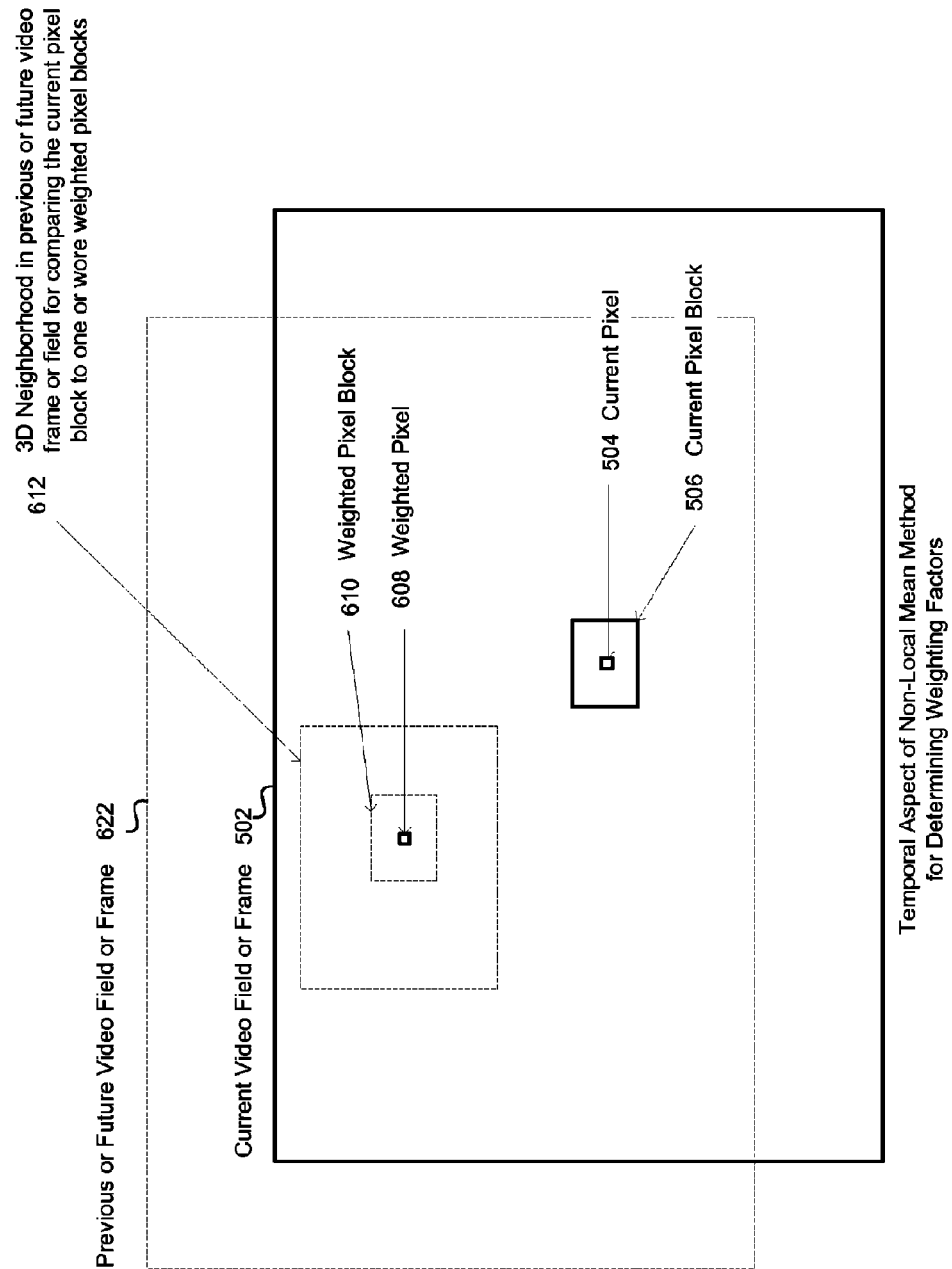
FIG. 6 is a block diagram illustrating non-local means for determining weighting values based on temporal redundancy of pixel structures, in accordance with an embodiment of the invention.

FIG. 6 is a block diagram illustrating non-local means for determining weighting values based on temporal redundancy of pixel structures, in accordance with an embodiment of the invention. Referring to FIG. 6, there is shown the current video field or frame 502, the current pixel 504, the current pixel block 506, the 2-D neighborhood 512 (FIG. 5), the weighted pixel 508 (FIG. 5) and the weighted pixel block 510 (FIG. 5). In addition, there is shown, a previous and/or future video field or frame 622, a weighted reference pixel 608, a weighted reference pixel block 610 and a 3D reference neighborhood 612.

The previous and/or future video field or frame 622 may be a video field or frame belonging to one or more previous or future frames that may comprise reference pixels for determining weighting factors for the diagonal matrix W vector. The weighted reference pixel 608, the weighted reference pixel block 610 and/or the 3D reference neighborhood 612 may be similar to the weighted pixel 508, the weighted pixel block 510 and the 2-D neighborhood 512 of FIG. 5. However, the weighted pixel 608, the weighted reference pixel block 610 and/or the 3D reference neighborhood 612 may be at least a portion of the previous and/or future video field or frame 622.

In operation, the NLM and WLSM decoder 426 may utilize a plurality of received reference pixels to determine the weighting factors for the diagonal weighted matrix W. The plurality of reference pixels may come from a 2-dimensional neighborhood 512 based on x, y dimensions within a spatial domain or from a 3-dimensional reference neighborhood 612 based on x, y and t dimensions within a temporal domain. For example, the weighting factors or weights w may be determined for a 2-dimensional range of reference pixels within the current video field or frame 502 comprising the current pixel 504 and/or for a 3-dimensional range of reference pixels in one or more prior and/or future reference video fields or frames, for example, the previous and/or future video field or frame 622. Although FIG. 5 and FIG. 6 show rectangular ranges or neighborhoods of reference pixels, the invention is not so limited. For example, reference pixels in any arbitrary direction relative to the current pixel location may be utilized for the comparison. The determined weights may be proportional to the similarity of the current pixel block 504 and the weighted reference pixel block 610. In this regard, the weighted reference pixel 608 may be associated with a higher weighting factor when the weighted reference pixel block 610 is the same or similar to the current pixel block 510 than when the pixel blocks have pixel values with a greater difference. In this manner, a plurality of weighting factors for the current pixel may be determined by comparing information from the current pixel block 506 with information from a plurality of weighted pixel blocks located within the 2D neighborhood 512 and/or the 3D reference neighborhood 612. A pattern of highly weighted or highly correlated pixels within the current video field or frame and/or one or more previous or future fields or frames may indicate a spatial and/or temporal pattern of redundant or similar pixel structures.

Figure 7:
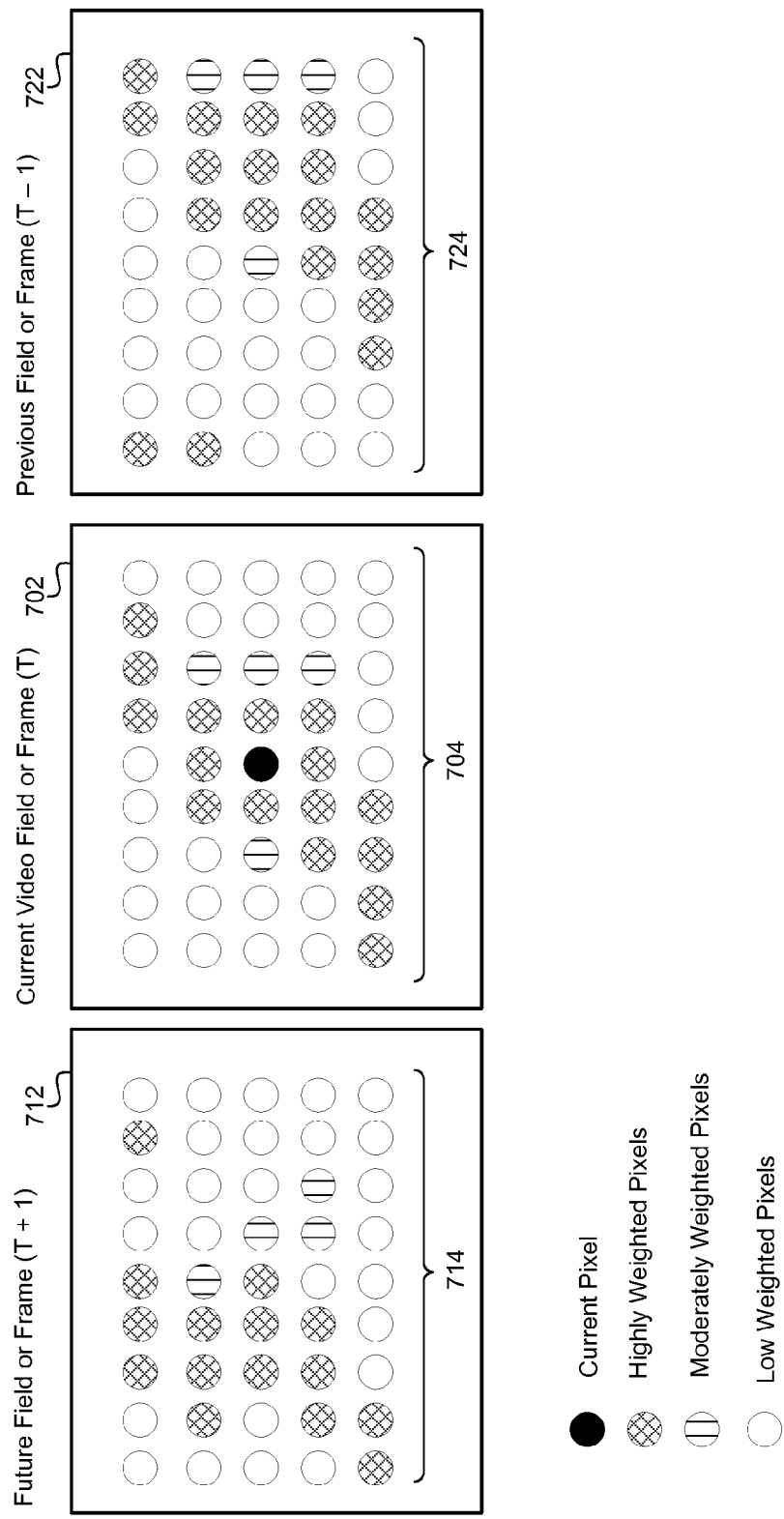
FIG. 7 is a block diagram illustrating a unified arbitrary spatial pattern and arbitrary temporal pattern of pixel structure redundancy, in accordance with an embodiment of the invention.

FIG. 7 is a block diagram illustrating a unified arbitrary spatial pattern and arbitrary temporal pattern of pixel structure redundancy, in accordance with an embodiment of the invention. Referring to FIG. 7, there is shown a current video field or frame 702 that may comprise a plurality of pixels 704, a future video field or frame 712 that may comprise a plurality of pixels 714 and a previous video field or frame 722 that may comprise a plurality of pixels 724.

The current video field or frame 702, the future video field or frame 712 and the previous video field or frame 722 may comprise exemplary weighted pixels from three different fields or frames that may be determined by the NLM and WSLM decoder 426, for example. The plurality of pixels 704 within the current video field or frame 702 may comprise the current pixel and a plurality of weighted reference pixels. The future video field or frame 712 and the previous video field or frame 722 may comprise weighted reference pixels 714 and 724 respectively.

In an exemplary embodiment of the invention, a pattern of weighted reference pixels from the plurality of pixels 704, 714 and 724 may indicate redundant pixel structures within the current video field or frame 702, the future video field or frame 712 and/or the previous video field or frame 722. The redundant pixel structures may be determined by comparing pixels in arbitrary directions from the current pixel. In this regard, the directions taken for comparison of pixel information from the current pixel to a plurality of reference pixels need not be symmetrical. Utilizing a unified arbitrary spatial and arbitrary temporal neighborhood of reference pixels may mitigate switch noise artifacts. Furthermore, by indicating redundant pixel structures over a plurality of video fields or frames, the pattern of weighted reference pixels from the plurality of pixels 704, 714 and 724 may reveal motion among the fields or frames without having to determine motion vectors.

In various embodiments of the invention the performance of video that is processed based on NLM and/or WSLM may be similar for PAL and NTSC video formats. Moreover, performance PAL60 and/or NTSC443 formatted video may be improved by utilizing unified spatial and temporal NLM and/or WSLM techniques relative to other techniques that may be limited to 2-dimensional filtering techniques.

Figure 8:
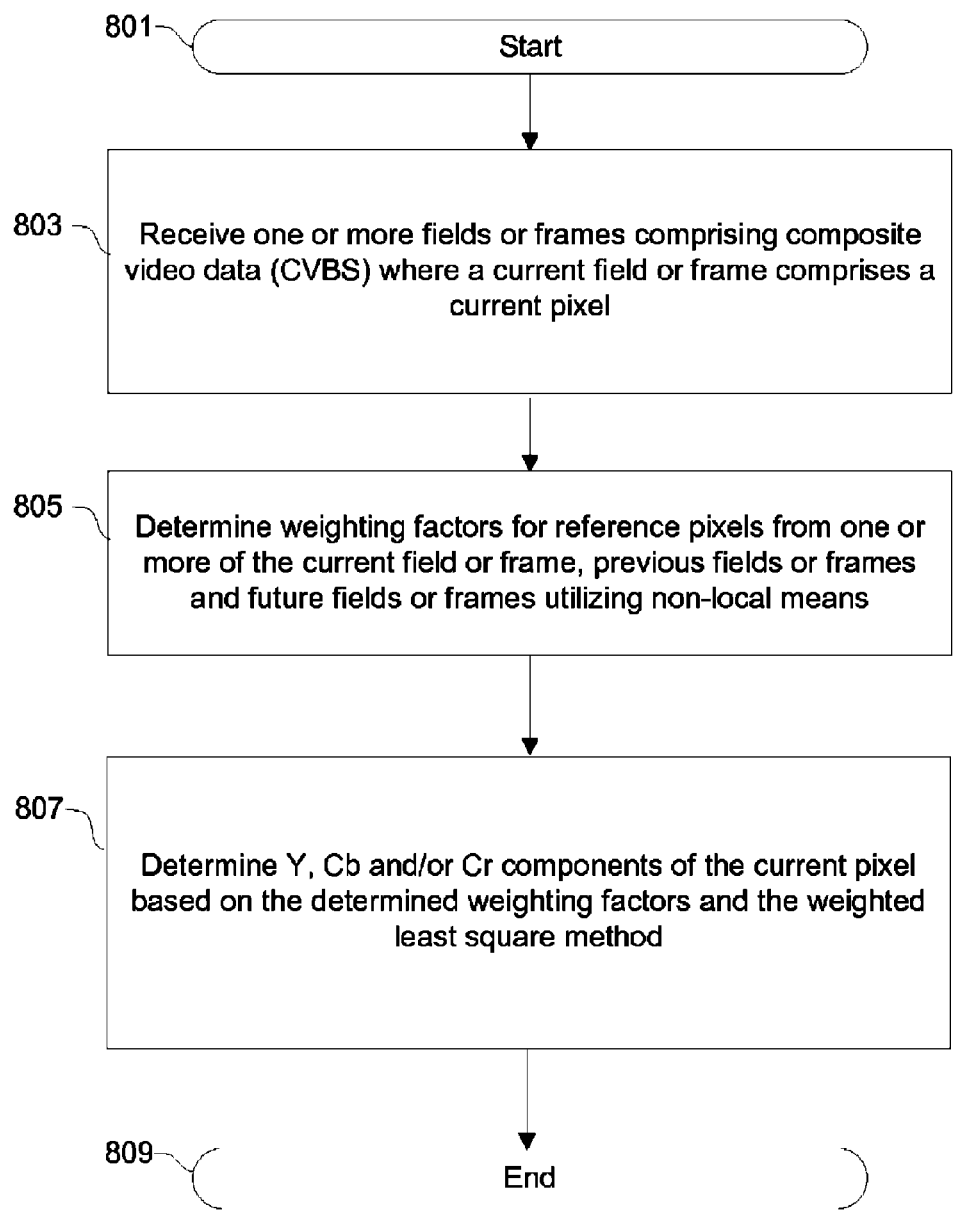
FIG. 8 is a flow chart illustrating exemplary steps for separating YCbCr based on non-local means and weighted least square method, in accordance with an embodiment of the invention.

FIG. 8 is a flow chart illustrating exemplary steps for separating YCbCr based on non-local means and weighted least square method, in accordance with an embodiment of the invention. The exemplary steps may begin with step 801. In step 803, one or more video fields or frames that may comprise composite video data (CVBS) may be received. The CVBS data may comprise, for example, the current video field or frame 502 (FIGS. 5 and 6) that may comprise the current pixel 504 (FIGS. 5 and 6) and one or more other fields or frames such as the previous and/or future video field or frame 622 (FIG 6). In step 805, utilizing non-local means, weighting factors may be determined for reference pixels from one or more of the current video field or frame 502 and/or previous and/or future fields or frames 622. In step 807, Y, Cb and/or Cr components of the current pixel may be determined based on the determined weighting factors and the weighted least square method. The flow chart ends at 809.

In an embodiment of the invention, one or more processors and/or circuits, for example, the decoder system 400 (FIG. 4) and/or the video processing module 200 (FIG. 2) may be operable to receive a composite video signal, for example, the composite input video signal 206 (FIG. 2). The decoder system 400 and/or the video processing module 200 may be operable to determine a current pixel, for example, the current pixel 504, and a plurality of reference pixels, for example, the weighted pixel 508 or 608 (FIGS. 5 and 6) in one or more fields or frames of the composite video signal, for example, the current frame 502 or the previous or future frame 622. In addition, a plurality of weighting factors w that may correspond to the plurality of reference pixels may be determined utilizing non-local means. One or more chroma components, for example, Cb 412 and/or Cr 418 and/or luma components Y 410 (FIG. 4) for the current pixel 504 may be determined based on weighted least squares utilizing the plurality of reference pixels, the corresponding plurality of weighting factors w and information that may be known about the composite video signal. In this regard, the received composite video signal 206 may comprise a baseband Y component, a modulated Cb component and/or a modulated Cr component. The determined one or more chroma components and/or luma components may comprise the Y component 410, the Cb component 412 and/or the Cr component 418. The information known about the composite video signal 206 may comprise the subcarrier signal sin $\omega t$ 314 (FIG. 3) and/or the subcarrier signal cos $\omega t$ 320 (FIG. 3) signal information, for example.

One or more of the plurality of weighting factors w for a corresponding one of the plurality of reference pixels, for example, the weighted pixel 508 or the weighted pixel 608, may be determined by comparing a block of pixels about the current pixel 504 with a block of pixels about the corresponding one of the plurality of reference pixels, for example, the reference pixel 508 or the reference pixel 608. The reference pixels 508 and/or 608 may belong to a field or frame that comprises the current pixel, for example, the current frame 502 or may belong to a field or frame that does not comprise the current pixel, for example, the previous or future frame 622. One or more chroma components Cb 412 and/or Cr 418 and/or one or more luma components Y 410 may be determined for the current pixel 504 based on solving a set of equations. The set of equations may comprise data from a set of the reference pixels, for example, the reference pixel 508 and/or 608, a set of weighting factors w corresponding to the set of reference pixels and a set of data comprising the information known about the composite video signal, for example, information regarding the subcarrier signal sin $\omega t$ 314 and/or the subcarrier signal cos $\omega t$ 320. One or more chroma components Cb 412 and/or Cr 418 and/or one or more luma components Y 410 may be determined for a plurality of pixels from the one or more fields or frames of pixels.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for utilizing non-local means (NLM) for separation of luma (Y) and chroma (CbCr).

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
performing by one or more processors, one or more circuits, or any combination thereof:
receiving a composite video signal;
determining a current pixel and a plurality of reference pixels from one or more fields or frames of pixels within said composite video signal;
determining a plurality of weighting factors corresponding to said plurality of reference pixels utilizing non-local means; and
determining one or more chroma components, one or more luma components, or a combination thereof for said current pixel based on weighted least square utilizing said plurality of reference pixels, said corresponding plurality of weighting factors and information known about said composite video signal.

2. The method according to claim 1, wherein said composite video signal comprises a baseband Y component, a modulated Cb component, or a modulated Cr component.

3. The method according to claim 1, wherein said one or more chroma components, said one or more luma components, or said combination thereof comprises Y, Cb, or Cr components.

4. The method according to claim 1, wherein said information known about said composite video signal comprises subcarrier signal information.

5. The method according to claim 1, comprising determining one of said plurality of weighting factors for a corresponding one of said plurality of reference pixels by comparing a block of pixels about said current pixel with a block of pixels about said corresponding one of said plurality of reference pixels.

6. The method according to claim 1, wherein one more of said plurality of reference pixels belongs to a field or frame that comprises said current pixel.

7. The method according to claim 1, wherein one more of said plurality of reference pixels belongs to a field or frame that does not comprise said current pixel.

8. The method according to claim 1, comprising determining said one or more chroma components, said one or more luma components, or said combination thereof for said current pixel based on solving a set of equations.

9. The method according to claim 8, wherein said set of equations comprises data from a set of said plurality reference pixels, a set of weighting factors corresponding to said set of said plurality of reference pixels and a set of data comprising said information known about said composite video signal.

10. The method according to claim 1, comprising determining said one or more chroma components, said one or more luma components, or said combination thereof for a plurality of pixels from said one or more fields or frames of pixels.

11. A system for processing video, the system comprising:
one or more processors, one or more circuits, or any combination thereof in a video processing device, wherein said one or more processors, said one or more circuits, or said combination thereof are operable to:
receive a composite video signal;
determine a current pixel and a plurality of reference pixels from one or more fields or frames of pixels within said composite video signal;
determine a plurality of weighting factors corresponding to said plurality of reference pixels utilizing non-local means; and
determine one or more chroma components, one or more luma components, or a combination thereof for said current pixel based on weighted least square utilizing said plurality of reference pixels, said corresponding plurality of weighting factors and information known about said composite video signal.

12. The system according to claim 11, wherein said received composite video signal comprises a baseband Y component, a modulated Cb component, or a modulated Cr component.

13. The system according to claim 11, wherein said one or more chroma components, said one or more luma components, or said combination thereof comprises Y, Cb, or Cr components.

14. The system according to claim 11, wherein said information known about said composite video signal comprises subcarrier signal information.

15. The system according to claim 11, wherein said one or more processors, said one or more circuits, or said combination thereof are operable to determine one of said plurality of weighting factors for a corresponding one of said plurality of reference pixels by comparing a block of pixels about said current pixel with a block of pixels about said corresponding one of said plurality of reference pixels.

16. The system according to claim 11, wherein one more of said plurality of reference pixels belongs to a field or frame that comprises said current pixel.

17. The system according to claim 11, wherein one more of said plurality of reference pixels belongs to a field or frame that does not comprise said current pixel.

18. The system according to claim 11, wherein said one or more processors, said one or more circuits, or said combination thereof are operable to determine said one or more chroma components, said one or more luma components, or said combination thereof for said current pixel based on solving a set of equations.

19. The system according to claim 18, wherein said set of equations comprises data from a set of said plurality of reference pixels, a set of weighting factors corresponding to said set of said plurality of reference pixels and a set of data comprising said information known about said composite video signal.

20. The system according to claim 11, wherein said one or more processors, said one or more circuits, or said combination thereof are operable to determine said one or more chroma components, said one or more luma components, or said combination thereof for a plurality of pixels from said one or more fields or frames of pixels.

* * * * *

UNITED STATES PATENT AND TRADEMARK OFFICE
CERTIFICATE OF CORRECTION

PATENT NO. : 8,508,668 B2  
APPLICATION NO. : 12/570114  
DATED : August 13, 2013  
INVENTOR(S) : Luo et al.

Page 1 of 1

It is certified that error appears in the above-identified patent and that said Letters Patent is hereby corrected as shown below:

In the Claims:

Column 12, line 19, after the word "Plurality" insert the word --of--.

Signed and Sealed this
Fifth Day of August, 2014

Michelle K. Lee
*Deputy Director of the United States Patent and Trademark Office*